May 20, 1952   T. S. SKILLMAN ET AL   2,597,538
ACCOUNTING DEVICE

Filed April 5, 1950   3 Sheets-Sheet 1

FIG. 1

Inventors:
T. S. Skillman,
A. D. Lackey,
By Ward Crosby & Neal
Attorneys.

FIG. 2

Inventors:
T. S. Skillman,
A. D. Lackey,
By
Attorneys.

May 20, 1952

T. S. SKILLMAN ET AL 2,597,538

ACCOUNTING DEVICE

Filed April 5, 1950

Inventors:
T. S. Skillman,
A. D. Lackey,
By Ward Crosby & Neal.
Attorneys.

Patented May 20, 1952

2,597,538

UNITED STATES PATENT OFFICE 2,597,538

ACCOUNTING DEVICE

Thomas S. Skillman, Mosman, near Sydney, and Alan D. Lackey, McMahon's Point, near Sydney, New South Wales, Australia, assignors to Communication Engineering Pty. Limited, New South Wales, Australia, a corporation of Australia Application April 5, 1950, Serial No. 154,092
In Australia April 11, 1949

6 Claims. (Cl. 235—92)

This invention relates to accounting devices which include electrically operated registering and indicating mechanisms and is more especially concerned with accounting devices for article dispensing systems in which the selection and dispensing of articles causes their prices to be added up and the amount to be exhibited and recorded.

In various circumstances it may be necessary to make temporary, or in certain cases, an alteration in the indicated amounts; for example, in article dispensing systems there may be a temporary increase or reduction of all or some of the prices, a tax may have to be added or a discount may be allowed upon some articles or to some classes of customers and so on.

The object of the present invention is to enable a modification of the accounted amount by a predetermined percentage upon a simple switching operation which may be performed by a manually actuated switch or by switching means operated, for example, from the delivery mechanism of certain classes of articles, so that in the case of those articles and those articles only, a discount is deducted from the price or an addition made to it, as may be required.

For this purpose the invention provides in such an accounting device an additional apparatus to vary the value indications by a predetermined percentage, this apparatus being dependent on the initial value indications of the registering and indicating mechanisms to vary the initially accounted value in accordance with said predetermined percentage and to initiate the indication of the varied value by the registering and indicating mechanisms.

The new apparatus contains means which are operated by the registering and indicating mechanisms and are so connected with these mechanisms that they influence these mechanisms in accordance with the predetermined percentage variation, that is in case of a rise, add the percentage amount, and in the case of a deduction, reduce the highest or reference denomination by one and add the complement of the discount to the lower denomination as will be explained hereafter.

Deduction of any small percentage, such as a discount is likely to be, from a digit of any order, such as one representing pounds or dollars, or tens of dollars, is equivalent arithmetically to the reduction of the digit by one and the addition in digits of less value such as shillings and pence, tens of cents and cents and so forth, of the difference between the discount and the unit of higher value; for example, deduction of 10% discount from £3 reduces the digit representing pounds to 2, and adds digits representing shillings to the value of £1 less the discount, that is £1 less 6/– or 14/–, which may be called the complement of the discount. A further feature of the invention consists in effecting deductions in this manner, the switching in of the discounting mechanism resulting in each selected digit of a higher order appearing reduced by one in the indicator, while digits of lower order add the complement of the discount.

The invention is applicable to all those kinds of accounting devices in which the counting and indicating mechanisms are electrically operated. A convenient way of indicating and adding is by use of rotary switches of the types used as selectors in automatic telephony. An accounting device operating in this way has been described in United States patent application Serial No. 110,979 by P. L. Law for "Recording Arrangements" filed August 18, 1949, and the present invention is further described below as applied to such a scheme.

As the variation in the amount registered is in direct proportion to this amount, the variation may be applied separately to each denomination e. g. 5% of ten shillings is 6d. whether the ten shillings represents the whole sum or only part of a sum such as £4.10.6½. It follows from this that for any fixed rate of variation the switches indicating the registered amount may also be made to indicate the variation thereon. If a bank of such a switch has its contacts connected to the appropriate terminals of the accounting device, a circuit completed through the contact on which the switch is positioned will cause the accounting device to add the amount of variation to the amount registered.

Where the variation is to be deducted, however, the contacts of the indicating switch are wired so as to add the complement of the variation; or in a preferred arrangement, the complement of the variation in the respective denomination, the indicating circuit of this denomination then being adjusted to indicate one unit less, resulting in the accounting device indicating the registered amount less the variation.

For example, if the variation were always less than £1 the amount added would be £1 less the deduction required. In the embodiment described below, the variation on the whole pounds is added as a deduction from 19/–, the variation on the shillings as a deduction from 11½d. and ½d. is added in all cases. The pounds circuit is then adjusted to read £1 lower. So that if no discount were allowable the sum added would be 19/-+11½d.+½d.=£1 and the pounds switch, being changed to read £1 lower, would leave the amount as before.

One embodiment of the invention will be described in detail hereafter and with reference to the accompanying drawings, in which.

The circuits for the counting, adding and indicating of prices and values are those described in the abovementioned United States application, to which reference should be made for a full description of their method of operation. Only those parts of the circuits are shown here which are essential for the working of the new apparatus; in particular, the recording devices and the means for temporarily storing price indications are omitted, as their functions are not affected by the new arrangement.

In the drawings the relays and their contacts are shown in accordance with the detached contact method, the contacts being shown where they are used in the circuit and not necessarily next to the corresponding relays. The relays are marked with capital letters and the corresponding contacts with the same small letters and an additional figure distinguishing the various contacts of the same relay. The relay contacts are shown in their normal position, all relays which are normally operated bearing the suffix M or X.

Figure 1:
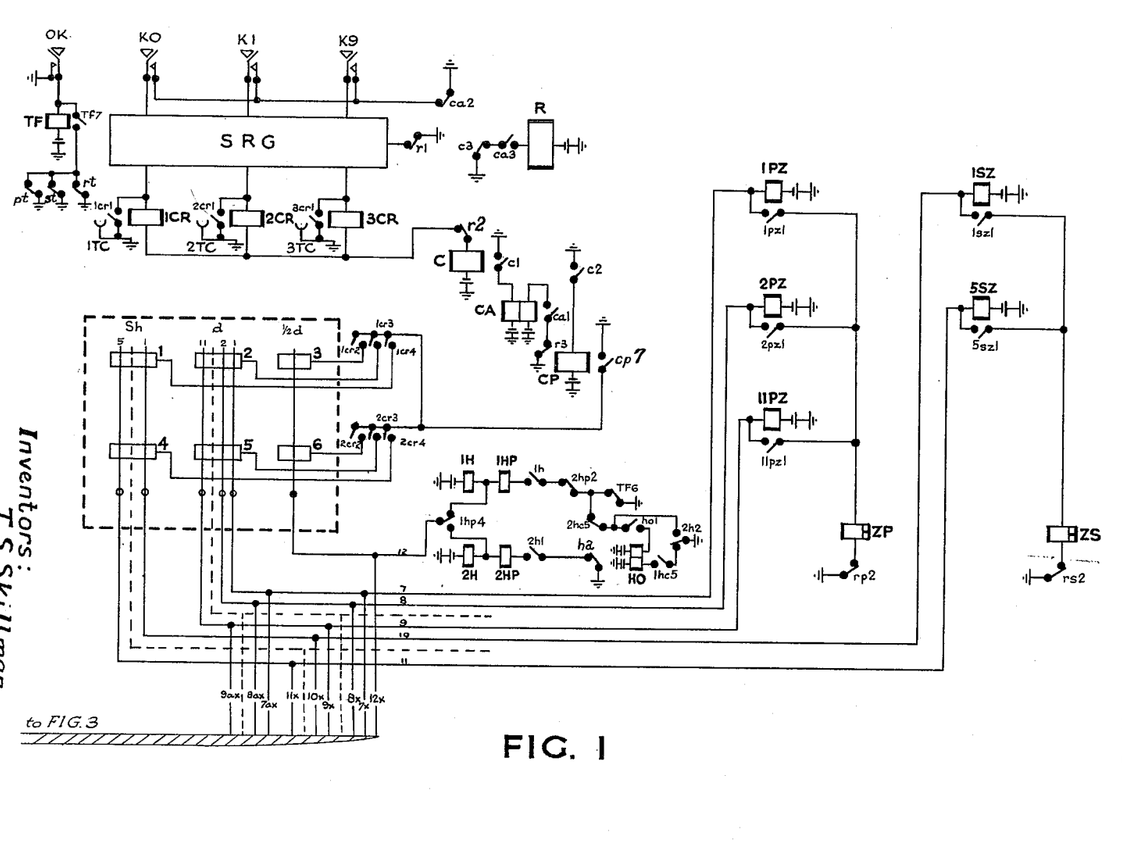
Fig. 1 shows schematically the operator's position of an article dispensing system together with the selecting relay group, the pricing frame, and the relays, operated either from the pricing frame or from leads from the discount device, which actuate the accounting mechanism.

In Fig. 1 the operator's position consists of a row of ten keys, K0 to K9, which are used to key up the various digits of a code number designating a particular kind of article. It must be understood, however, that a separate key for each kind of article can be provided without altering the pricing arrangement described later on.

As a selection of articles itself is not part of the present invention the selecting relay group SRG is only schematically indicated. Only those relays are shown which are necessary to give a clear understanding of the operation of the recording arrangements. A selecting relay group which can be used in this connection is, for example, described in United States application Serial No. 110,149 filed August 13, 1949, for improvements in "Selection Circuits."

Whenever an article is to be selected the digits corresponding to its code number are keyed up by pressing the corresponding keys and circuits are established from earth via contact $ca2$ and the pressed keys K0 to K9 to the selecting relay group SRG. The selecting relay group SRG operates various relays over earth provided via contact $r1$ and finally operates one of the clutch relays 1CR to 3CR over contact $r2$ and relay C to battery. The number of CR relays is solely dependent on the number of various kinds of articles which have to be stored and dispensed and has no relation to the number of keys used for the selection in case the selection of articles is performed by keying up the digits of their respective stock numbers.

When operated the clutch relays 1CR to 3CR lock themselves up over their contacts $1cr1$ to $3cr1$ and their corresponding trip contacts 1TC to 3TC. The CR relays at the same time operate their other contacts, for example $1cr2$, $1cr3$ and $1cr4$ of relay 1CR or the corresponding contacts of the other CR relays to put earth onto a pricing frame PFR to mark the price of a selected kind of article.

The C relay, operated in series with one of the clutch relays CR, energises over contact $c1$ the CA relay which in turn prepares a circuit over contact $ca3$ for the release relay R. On the release of an article the corresponding trip lever contact TC is interrupted, and the circuits CR and C are released. A circuit is closed for relay R over contacts $c3$ and $ca3$, and this relay releases the selecting relay group, as described in the said United States application Serial No. 110,149 filed August 13, 1949, for improvements in "Selection Circuits."

The pricing frame PFR, which is only schematically shown in Fig. 1, consists of a number of vertical bars, for example, one for half-pence, eleven for the values from one to eleven pennies, and five for the values from one to five shillings. Horizontal bars passing over and insulated from the shilling bars, the penny bars or the half-penny bar, are provided for and connected with each of the three contacts for every clutch relay CR as indicated by the bars 1, 2 and 3 connected with the contacts $1cr4$, $1cr3$ and $1cr2$ respectively of relay 1CR, and the bars 4, 5 and 6 connected with the contacts $2cr4$, $2cr3$ and $2cr2$ respectively of the clutch relay 2CR. To mark the price of the article associated with relay 1CR on the pricing frame electrical connections are made between the bars 1, 2 and 3 and the required vertical price bars passing underneath them. If the price of the article is one and twopence, for example, bar 1 is connected to the one shilling vertical bar, and bar 2 to the twopenny vertical bar. The prices of other articles are similarly marked.

The price bars of the pricing frame are connected via leads 7, 8, 9, 10, 11 and 12 (for the price bars shown) with control relays which control the operation of the registering and indicating mechanisms. Each pence price bar is connected to one of the relays 1PZ to 11PZ and each shilling price bar to one of the relays 1SZ to 5SZ, while the half-penny price bar is connected to the contact $1hp4$ and thence to the half-penny control relays 1H, 2H, etc. If earth is applied to a pence or shilling price bar by the operation of the corresponding CR relay on the selection of an article, the PZ or SZ relay to which the bar is connected is operated, and closes a holding circuit for itself in series with relay ZP or ZS and contact $rp2$ or $rs2$. The operated relay PZ or SZ then closes further contacts (Fig. 2), the functions of which will be described later. When earth is applied to the half-penny bar and thus to lead 12, the relay 1H is energised over contact $1hp4$ and closes its contact $1h$, thus providing a new circuit from battery over relay 1H, relay 1HP, contact $1h$, contact $2hp2$ and contact $tf6$ to earth. Relay 1HP is thus energized as soon as earth is removed from lead 12. The relay HO is not affected at this stage. The relay 1HP changes over its contact $1hp4$, so that when another half-penny is marked on the pricing frame it will be stored in the relays 2H and 2HP. The functions of other contacts of the relays 1H, 1HP, 2H and 2HP will be described later.

The leads 7, 8, 9, 10, 11 and 12, besides being connected to the price bars of the pricing frame PFR are also connected to the leads 7x, 8x, 9x, 10x, 11x and 12x, and 7ax, 8ax and 9ax of cable 30, and it will be apparent that the earthing of any of these leads will have the same effect on the control relays as the earthing of the corresponding price bars.

Figure 2:
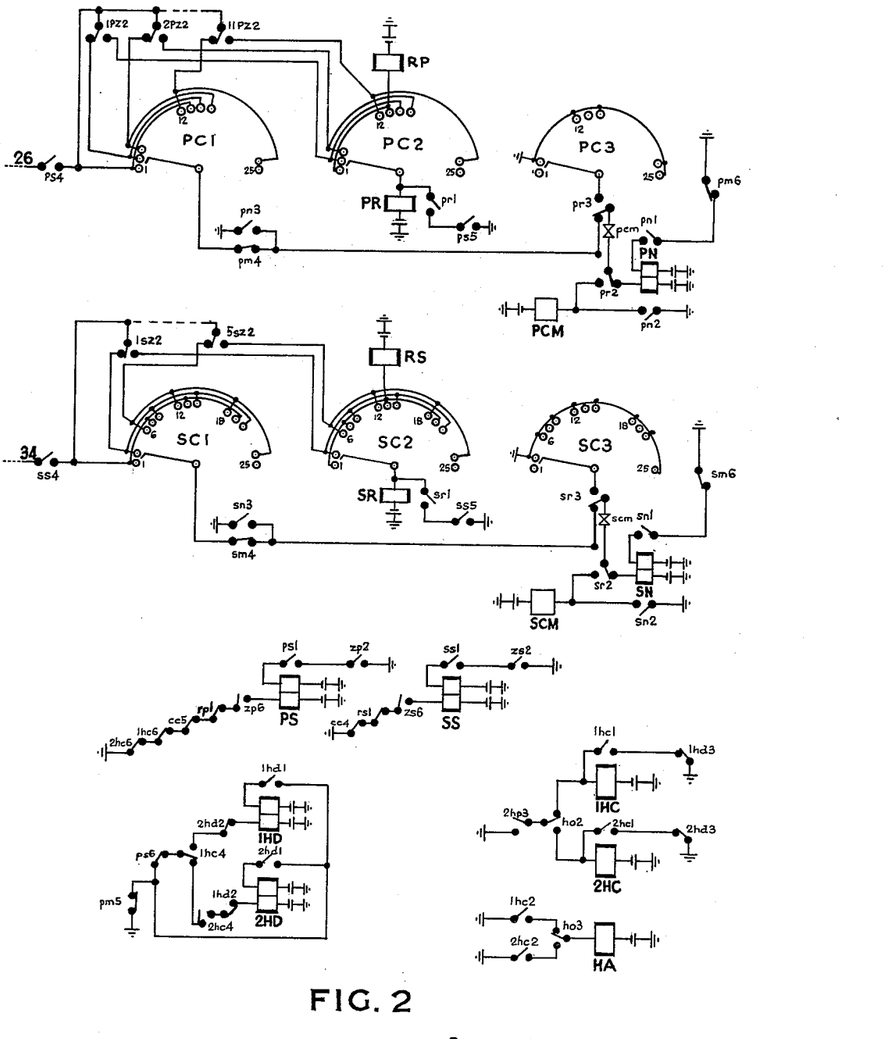
Fig. 2 shows the counting device and the relay circuits therefor.
Figure 3:
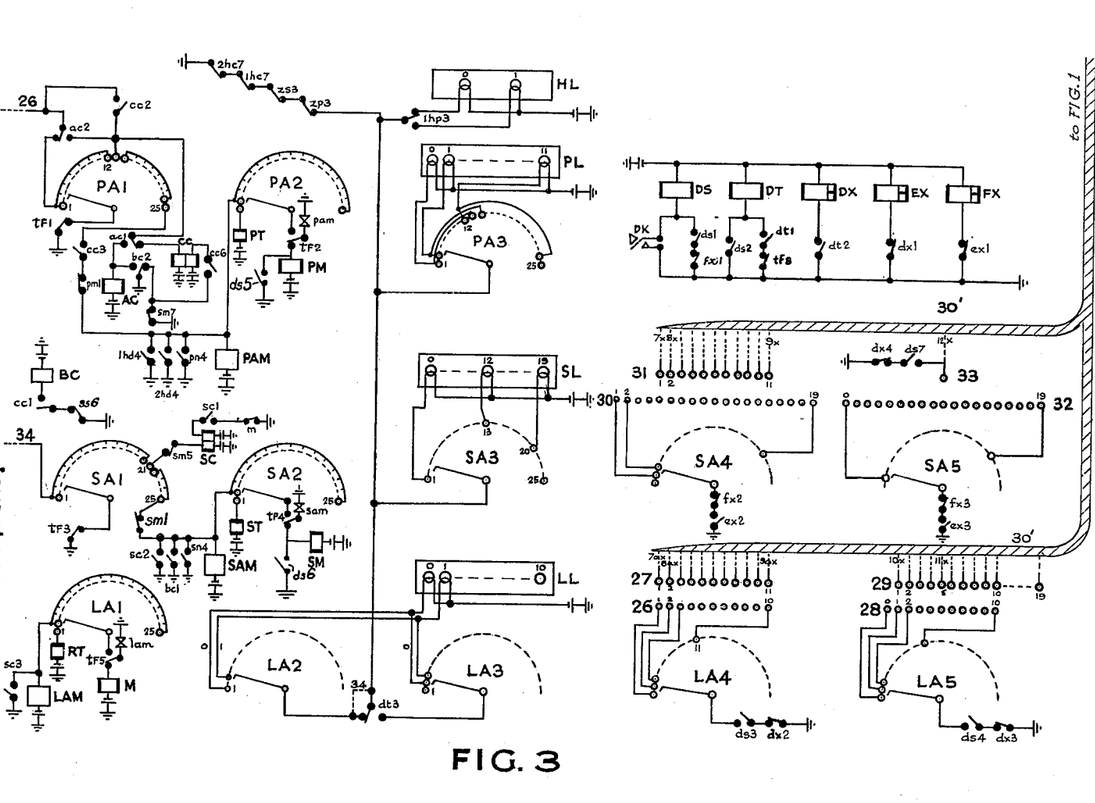
Fig. 3 shows the circuit arrangements for the adding of pennies, shillings and pounds and for the operation of corresponding indicator lamps, and the apparatus for altering the indicated amounts as required.

Referring now to Figs. 2 and 3, which show the circuits for counting and adding the prices marked from the pricing frame or from the leads 7x etc. on the control relays. The operation of relay ZP or ZS closes contact zp6 or zs6 and thus operates relay PS or SS. The operated relay PS or SS holds itself over its own contact ps1 or ss1 and contact zp2 or zs2. The operation of a relay PZ or SZ fulfils one function only, to mark a certain position on the penny counting switch PC or the shilling counting switch SC. Suppose now that one of the relays PZ has been operated, and the relay ZP in series with it. The switch PC (which has three contact banks pc1, pc2 and pc3) starts hunting for a marked terminal as soon as a start impulse is received from the penny start relay PS, which by closing its contact ps4 completes a circuit for relay PN from battery over relay PN, contact pr2, interrupter pcm, contact pr3, normally closed contact pm4, wiper and contact 1 of switch bank PC1, contact ps4, lead 26, contact ac2 (Fig. 3) contact 1 and wiper of switch bank PA1, and contact tf1 to earth. Relay PN closes its contacts pn1 and thus forms a locking circuit over its second winding, contact pn1 and contact pm6 to earth. A further locking circuit is closed from earth over contact pn3, contact pr3, interrupter pcm, contact pr2 and relay PN to battery. Over contact pn2 the switch magnet PCM and over pn4 (Fig. 3) the switch magnet PAM are energised to step up the penny counting switch PC and the penny adding switch PA.

The circuit is so arranged that both switches make an equal number of steps before relay PN effectively releases again. When magnet PCM operates it interrupts the circuit for one winding of relay PN at interrupter pcm and when magnet PAM operates it interrupts the circuit for relay PM and interrupter pam, which in turn interrupts the second locking circuit for relay PN at contact pm6. As soon as both switches have stepped up one step and relay PN has been released, this relay is energised again as the circuit runs now from contact ps4 over contact 1pz2, second contact of switch PC1 and then the same way as described above. Thus switches PC and PA are stepped up together.

As soon as the switch PC reaches the contact position connected to the operated contact pz2 (for example the twelfth contact position if the relay 11PZ is the operated control relay), the operating circuit for relay PN is interrupted at contact bank pc1 as contact 11pz2 is operated. At the same time a new circuit is closed from earth via contact tf1 (Fig. 3), wiper and twelfth contact of switch bank PA1, contact ac2, lead 26, contact ps4 (Fig. 2), contact 11pz2, twelfth contact and wiper of switch bank PC2, and relay PR to battery. This relay closes a locking circuit over contacts pr1 and ps5 to earth. While the magnet PAM of the adding switch remains unoperated, the magnet PCM of the counting switch is now stepped up from earth via the switch bank and wiper PC3, operated contact pr3, interruper pcm, operated contact pr2 and magnet PCM to battery.

When the counting switch PC reaches its home position or its equivalent with wipers resting on the first or thirteenth contact of the switch banks, relay RP is energised from earth over contacts ps5, pr1, wiper and contact of switch bank PC2 and relay RP to battery.

At contact rp2 (Fig. 1) the locking circuit for relays ZP and 11PZ is interrupted, so that these relays release. Relay ZP opens the locking circuit for relay PS (Fig. 2) at contact zp2. The release of relay PS performs the release of relays PR and RP (Fig. 2) at contact ps5. Relay ZP is a slow release relay to ensure that relay 11PZ has released and opened its contact 11pz1 before relay RP releases, to prevent the relay 11PZ from coming up again over contact rp2.

The price is now indicated at the penny lamp indicator (PL) from battery over lamp 11 (connected with the twelfth contact of switch bank PA3), and contacts zp3, zs3, 1hc1 and 2hc1 to earth. These break contacts, which are common to all lamp circuits, prohibit a lighting up of the indicator lamps while adding is still in progress.

A similar arrangement is provided for the counting and adding of shillings. The relays 1SZ to 5SZ mark the shilling counting switch SC, and the shilling start relay SS, operated by relay ZS over contact zs6, initiates the stepping up of the shilling counting switch SC and the shilling adding switch SA to the marked position. Switch SC then homes, leaving switch SA on the marked position ready to add another price. These operations are controlled by relays SN, SR and RS in the same way as described above for relays PN, PR and RP in connection with the counting and adding of shillings. Additional SZ relays may of course be provided if the price of any individual article is to contain more than five whole shillings or if the apparatus to be described is to be used for effecting discounts.

When the penny adding switch PA reaches its thirteenth contact, corresponding to twelve pennies, the shilling adding switch SA has to be stepped up one step. This is done in the following manner.

At the thirteenth contact of bank PA1 the circuit for relay PN (Fig. 2) is interrupted and a new circuit is closed for relay CC (Fig. 3) from earth over contact tf1, wiper and thirteenth contact of PA1, contact ac1 and relay CC to earth. Over contact cc6 a locking circuit is closed over the second winding of relay CC and the normally closed contact sm1 of relay SM in parallel with contact bc2 to earth. Over contact cc2 the circuit for relay PN is re-established, so that the rest of the stored pennies can be added up at switch PA. At the contacts cc5 and cc4 (Fig. 2) the circuits for the penny start relay PS and the shilling start relay SS respectively are interrupted to prohibit the adding of additional prices until the shilling adding switch SA has made its step to mark the twelve pennies set up at the penny adding switch PA.

Over contact cc1 (Fig. 3) of relay CC the relay BC is energised from battery over relay BC, contact cc1 and contact ss6 to earth. The latter break contact prohibits the operation of relay BC while counting of shillings is still in progress and the shilling start relay SS is operated. Relay BC energises the magnet SAM of the shilling adding switch SA over contact bc1 and interrupts the contact for one winding of the CC relay at contact bc2, at the same time energising relay AC. Relay CC however is still kept up over contact sm1. Magnet SAM interrupts temporarily the circuit for relay SM at interrupter *sam*. Thus contact *sm*7 opens and releases relay CC, which in turn releases relay BC. The opening of contact *bc*1 de-energises the magnet SAM which thus steps the switch SA up one step to add a shilling. The contacts *cc*4 and *cc*5 (Fig. 2) are closed again, and further prices can be added. At contact *bc*2 (Fig. 3) the circuit of relay AC is interrupted again. The function of this relay is to prevent the CC relay from coming up again in case the PA switch has finished adding on the thirteenth contact. Relay AC is then kept energised from earth via contact *tf*1, wiper and contact bank PA1, contact *ac*1 and relay AC to battery. Thus this relay remains energised even when CC has released. For further adding the circuit for the relay PN is established over contact *ac*2, until the wiper of PA1 leaves the thirteenth contact and releases relay AC so that the whole circuit returns to normal.

Provision is made to give an indication of pound amounts as soon as the shilling adding switch SA (Fig. 3) has reached a position corresponding to twenty shillings. In this case the wipers of switch SA rest on the twenty-first contact of each bank and at bank SA1 the circuit for the relay SN which is operating the adding switch SA is interrupted. The relay SC (Fig. 3) in energised from earth over contact *tf*3, wiper and contact bank SA1, normally closed contact *sm*5, relay SC to battery. This relay closes a locking circuit for its second winding over the normally closed contact *m* and the contact *sc*1. Over contacts *sc*2 and *sc*3 the magnets SAM and LAM respectively are energised and open their interrupter contacts *sam* and *lam*. Thus the relays SM and M are de-energised, opening their contacts *sm*5 and *m* and thus interrupting the circuits of the two windings of relay SC. Relay SC releases when both magnets are thus energised and breaks the circuits for the magnets SAM and M at the contacts *sc*2 and *sc*3. The magnets when releasing step the shilling adding switch SA and the pound adding switch LA up one step, and the pound amount is indicated on the indicator lamps LL via the wiper and contact bank LA1, in the same way as mentioned before for the penny indicator PL. Shilling amounts are similarly indicated on the shilling indicator SL.

The shilling adding switch is now on its twenty-second contact, and a circuit is made from earth over contact *tf*3, wiper and contact bank SA1, contact *sm*1 and magnet SAM to battery. By intermittent operation of relay SM and magnet SAM switch SA returns to its initial position, so that it is ready again to add up further shilling amounts. The penny relay groups and the shilling relay groups are independent of each other, so that when a price containing only shillings and no pennies is to be counted no relays of the penny groups are operated and vice versa, except when twelve pennies are reached at the penny adding switch and the shilling adding switch makes one step as described before.

The arrangement for the counting and adding of half-pennies is different from the arrangements described above for pennies and shillings. When earth is applied to the half-penny bar of the pricing frame PFR (or to lead 12*x* in cable 30) and thus to lead 12, the relay 1H is energised over contact 1*hp*4 and closes its contact 1*h*, thus energising relay 1HP and changing over contact 1*hp*4 as described above. The closing of contact 1*hp*3 (Fig. 3) lights up the "1" half-penny lamp in the lamp indicator HL over the common lamp circuit. If no half-pennies were called up the "0" half-penny lamp would light up over contact 1*hp*3 in its unoperated position. At contact 1*hp*4 (Fig. 1) the lead 12 is now connected with the relay 2H which will operate when that lead is next earthed. Relay 2H then closes its contact 2*h*1 which prepares a circuit to operate relay 2HP as soon as earth is removed from lead 12. At contact 2*hp*2 the circuit for the relays 1H and 1HP is interrupted so that these relays release and are now ready for the next counting of an half-penny.

Over contact 2*hp*3 (Fig. 2) a circuit is closed from earth via contact 2*hp*3, contact *ho*2 and relay 1HC to battery, and relay 1HC is energised. This relay closes a locking circuit for itself over contacts 1*hd*3 and 1*hc*1. Over operated contact 1*hc*2 and contact *ho*3 the HA relay is energised, interrupting at contact *ha* (Fig. 1) the circuit for the relays 2H and 2HP. Thus one penny marking is stored in relay 1HC.

At the released contact 2*h*2 (Fig. 1) the relay HO is earthed via contact 1*hc*5 and this relay locks itself from earth over contact *tf*6, contact 2*hc*5, contact *ho*1 and relay HO to battery. Relay HO changes over its contact *ho*2 (Fig. 2) to prepare a circuit for relay 2HC which will store the next penny for adding.

At the contacts 1*hc*6 and 2*hc*6 the circuit for energising the relay PS is interrupted, so that the stored penny markings can be transmitted to the adding switch PA as soon as the penny markings stored before and transmitted via the relay PS are added up. When the relay PS is in the unoperated condition a circuit is closed from earth via the normally operated contact *pm*5, contact *ps*6, operated contact 1*hc*4, contact 2*hd*2 and relay 1HD to battery. This relay locks itself over its own contact 1*hd*1 and contact *pm*5 to earth, releases relay 1HC at contact 1*hd*3, while contact 1*hd*4 (Fig. 3) energises the switch magnet PAM which at interrupter *pam* interrupts the circuit for relay PM so that at contact *pm*5 (Fig. 1) the circuit for relay 1HD is broken. Relay 1HD releases magnet PAM, which thus steps the penny adding switch PA up one step to count the penny stored in relay 1HC. The next penny stored in relay 2HC is added in the same way via the relay 2HD, which is now energised from earth via contact *pm*5, contact *ps*6, 1*hc*4, operated contact 2*hc*4, contact 1*hd*2 and relay 2HD to battery. The operation of the penny adding switch proceeds in the same manner as described before, as contact 2*hd*4 (Fig. 3) operates parallel to contact 1*hd*4.

When all the articles belonging to one order have been keyed up and released from their respective bins, and the total of the prices of all these articles is indicated in pounds, shillings, pence and half-pence by the price indicators LL, SL, PL and HL respectively, the operator may, if it is not desired to make any alteration to the indicated total by way of discount or otherwise, press the order complete key OK (Fig. 1) and return the whole apparatus to the normal position, homing the adding switches LA, SA and PA and releasing relay 1HP so that all the price indicators show zero and the apparatus is ready to count and add the prices of a further order.

Means are provided according to the invention, however, to enable the indication of the total price of an order to be varied in any way, by either subtracting or adding a desired percentage of the original amount.

The temporary pressing of the order complete key OK energises the relay TF, which operates its contact tf1 and closes a holding circuit for itself from battery over contact tf7 and contacts pt, st and rt in parallel to earth. Relay TF also opens its contacts tr1, tf3 and tf6 (Figs. 3 and 1) and changes over its contacts tf2, tf4 and tf5 (Fig. 3) to close circuits for the magnets PAM, SAM and LAM over the wipers and contact banks PA2, SA2 and LA1 respectively. As the interrupter contacts of the magnets are included in these circuits, the three adding switches are stepped back to their home position. As soon as each wiper reaches its home position the circuit for the corresponding magnet is interrupted, and the relays PT, ST and RT are thus energised to operate their contacts pt, rt and st respectively. Since these contacts are connected in parallel in the holding circuit of the relay TF, this relay releases when all three switches have returned to their initial positions. The circuits are now ready to count and add the prices of another order.

The additional apparatus required to enable variations to be made in the total price indicated comprises the banks LA3, LA4 and LA5 of the pound adding switch LA, the banks SA4 and SA5 of the shilling adding switch SA, the terminal groups 26, 27, 28, and 29, and the cable 30' containing leads such as 7x to 12x and 7ax, 8ax and 9ax, which connect various contact positions of the contact banks LA4, LA5, SA4 and SA5 to the leads 7 to 12 in Fig. 1 in a manner to be described later.

The required rate of variation is set up by connecting together appropriate leads of the cable 30' leading to the counting units with contacts of the switches as indicated by the terminal groups 26 and 27, 28 and 29, 30 and 31, 32 and 33. These terminals may be connected by jumper wires or may form part of sockets to be connected by suitably strapped plugs or by similar switching means. The group of terminals 26, 27 enables adjustment of penny amounts as variation of pound amounts while the terminal group 28, 29 accounts for shilling variations of the same pound amounts. Similarly the shilling amounts are varied by pennies and half-pennies and these variations are adjusted and transferred into the appropriate counting arrangements over the terminal groups 30, 31 and 32, 33 respectively. In case of a discount, the complements of the amounts to be deducted are added and the amount from which discount is made is reduced by one unit as mentioned above in which case additional relays 6SZ to 19SZ will be added to the series 1SZ–5SZ in Fig. 1, with connections over cable 30' to terminals 29 (Fig. 3). The contacts of these relays will control the operation of switch SC (Fig. 2), in the same manner as described for contacts 1sz2 to 5sz2.

After the normal adding operation has been completed, the new arrangement is brought into function by a switch DK which operates the relay DS for starting the operations. This switch can be operated either by the operator or the contact can be closed by some other means, for example, by a relay operated automatically at the delivery of certain articles. A further relay DT fulfils several functions and is used to terminate the operations after receipt of a suitable signal through contact tf8. To make sure that the apparatus operates in predetermined sequence, a group of slow release relays DX, EX, FX are provided, which are normally in their operated condition, for which reason their references include the letter X. Thus the corresponding contacts dx1, to dx3, ex1 and fx1 to fx3 are normally closed, while the contacts ex2 and ex3 are normally open.

The operation of the new apparatus will now be described in detail, it being assumed that a certain amount is indicated by the position of the pound-, shilling- and penny switches of the registering and indicating mechanism and a discount has to be made on this indicated amount.

When the discount key DK is temporarily closed by an operator or automatically by a signal received, relay DS operates from battery over key DK to earth and locks over operated contact ds1, normally operated contact fx1 to earth.

Operated contact ds2 energises relay DT which locks over its own operated contact dt1 and contact tfs.

Operated contact ds3 applies earth through normally operated contact dx2 and wiper and a bank contact LA4 to one of the terminals 26, depending on which contact the wiper LA1 rests following the operation of the abovementioned registering and indicating mechanism. The terminal 26 will be strapped to a terminal in the group 27, depending on the number of pence in the amount of discount allowable on the number of pounds represented by the particular terminal 26.

The terminals 26 and 27 may all be combined in a multi-point socket, and a plug, suitably strapped in accordance with the rate of discount wanted, is fitted into this socket. Any adjustment in the rate can then easily be made by fitting another plug, strapped according to the new rate, into the socket.

The terminals 27 extend the circuit over a corresponding wire of cable 30' to the leads 7, 8 and 9 etc. and thence to an appropriate PZ relay. This pence marking is not yet counted, however, as the relays PM and SM (Fig. 3) are held operated by contacts ds5 and ds6, thus preventing the operation of the adding circuits.

Operated contact ds4 applies earth through normally operated contact dx3 to wiper LA5 and a contact of the associated bank to one of the group of terminals 28. Each of these terminals, representing a number of pounds, is strapped to a terminal in row 29, representing the number of shillings in the discount on said number of pounds. The terminals 29 extend the circuit over cable 30' to the appropriate S2 relay, but the shilling marking is not yet counted as contact cc4 is open and relay ZS cannot be energised. Operated contact ds7 applies earth through normally operated contact dx4 over cable 30' to wire 12 which records ½d. to be added when the disabling contact ds6 is released.

Operated contact dt2 breaks the circuit for relay DX which is slow to release.

Operated contact dt3 removes earth from the wiper LA2 and applies it to wiper LA3.

The contacts associated with these wipers are connected individually to the pounds indicating lamps LL. Each of these lamps, numbered 0 to 10 pounds respectively, is connected to one contact on each of these banks, so arranged, as shown by the numbers on the contacts, that the circuit through wiper LA3 is connected to lamp indicating £1 less than the circuit through wiper LA2 in the same position of the switch. Thus the operation of contact dt3 causes the pounds lamps to indicate one pound less than previously.

When relay DX releases contact dx1 breaks the circuit for slow-release relay EX.

Contacts dx2, dx3 and dx4 break the circuits previously described to the shillings, pence and half-pence counting units. The circuits in the counting units are now ready to receive another set of figures to be added.

When relay EX releases contact ex1 breaks the circuit for slow-releasing relay FX.

Contact ex2 applies earth through still operated contact fx2 and wiper SA1 to a bank contact and the corresponding contact in terminal group 30. The particular contact will depend on the number of shillings, indicated by the shillings switch SA, from which a deduction has to be made. According to the rate of discount each of these terminals will be strapped to a terminal in the group 31, corresponding to the number of pence in the amount of discount on the shillings, from which the circuit will be extended to the pence counting unit 23. Similarly contact ex3 closes a circuit from earth, through still operated contact fx3 wiper SA2 and associated bank contact to a terminal in group 32. Terminals in this group may be connected to terminal 33 if a half-penny forms part of the amount of discount on the shillings, thus completing the circuit to the half-pence counter in pence counting unit 23.

When relay FX releases after a time delay contacts fx2 and fx3 break these circuits, leaving the amounts stored in the various counting units, ready to be added. Contact fx1 releases relay DS.

Contacts ds5 and ds6 open and permit the counting switches to count the amounts of discount, so that the total less discount will now be indicated on the lamps of the various price indicators. The relay DT remains locked until all amounts are added and the contact tf8 is broken to indicate the completion of the accounting operations. When relay DT releases it breaks its holding circuit at contact dt1 and closes a circuit for relay DX at contact dt2, so that the relays EX and FX are operated again over the contacts dx1 and ex1 respectively. At contact dt3 earth is put back on wiper LA3 so that no further reduction is indicated at the lamps LL, when further amounts are added.

Should the variation have been an increase instead of a discount, the amounts added would be the actual increases instead of complements and the contact dt3 at wiper LA3 would be strapped out to prevent it reducing the number of pounds.

To give a numerical example about the manner in which the discount is worked out, it may be assumed that a discount of 3/6d. is to be made from £2. 8. 4. In a normal subtraction the resulting amount is £2. 4. 10. In the arrangement described above the complement value of the discount, £1—3/d.=16.6 d., is added through the units PA and SA and the £ amount is reduced by £1 over switch LA4, thus making the following calculation: £2. 8. 4+16. 6—£1=£2. 4. 10. As the discount is normally expressed in percentage of the values the terminals 26, 27 and 28, 29 are connected to give the complements in shillings and pence of the discount on the £ values according to this percentage while the terminals 30, 31 and 32, 33 are connected to give the corresponding amounts in pence and half-pennies on the shilling amounts. The original pence values normally remain unaltered as a discount would be too small to be accounted.

Suppose that the total price of an order indicated by the various indicating devices is £10. 10. 0, and that the apparatus is set to allow a discount of 5 per cent. The tenth terminal of terminal group 28 will in this case be strapped to the ninth terminal of group 29 and thence connected to the relay 9SZ (a relay performing the same function in the counting of an amount of nine shillings as the relays 1SZ and 5SZ in Fig. 1 do for the amounts of one shilling and five shillings respectively), while the tenth terminal of terminal group 30 will be strapped to the fifth terminal of group 31 and thence to the relay 5PZ (not shown in Fig. 1 but indicated in the series 1PZ to 11PZ), and the tenth terminal of group 32 will be strapped to terminal 33. When the key DK is pressed an amount of nine shillings plus fivepence plus a half-penny plus a half-penny (the last half-penny over contacts ds7 and dx4) will be added, while one pound will be subtracted. The amount indicated will then be £9. 19. 6, which is £10. 10. 0 less 5 per cent. The amounts to be added in any case, which determine the proper strappings, are the amounts nineteen shillings less the discount on the whole pounds, and eleven-pence half-penny less the discount on the whole shillings. The discount on pence is neglected here, although it could be provided for in the same manner, while one-half penny is added in all cases.

To take another example, suppose that 19/6d. is indicated, and 5 per cent discount is to be allowed. The discount on the whole pounds is zero, while the discount on the whole shillings is 11½d. The discount on the 6d. is neglected. The amounts to be added to the 19/6d. indicated are accordingly 19/-(19/- —0), zero (11½d.—11½d.), and ½d. giving a total of £1. 18. 6½. £1 is then subtracted, giving an amount of 18/6½d., which is 19/6d. less the required discount of 5 per cent (or 11½d.). The only strapping in this case will be the terminal 0 of group 28 to the terminal 19 of group 29, the terminals 19 of groups 30 and 32 being in this case disconnected. Had the required discount been 2½ per cent instead of 5 per cent, the discount on the whole shillings would have been sixpence and the amount to be added in consequence 5½d. (11½d.—6d.); in this case the terminal 19 of group 30 would be strapped to terminal 5 of group 31, and terminal 19 of group 32 to terminal 33.

If the variation required is to be added, switch bank LA3 and contact dt3 are strapped out of the circuit, as indicated by the dotted strapping 34 (Fig. 3), and the amounts added are calculated from the whole pounds and whole shillings separately. Thus if 5 per cent is to be added, terminal 10 of group 28 is, for example, strapped to terminal 10 of group 29 (to add 10/-), while terminal 10 of group 30 is strapped to terminal 6 of group 31 (to add 6d.).

In the embodiment described above the deduction is performed from the total added-up amount. Should it be desired to effect a variation on only certain of the amounts to be totalled in the accounting device, these amounts may be added first, and the variation effected thereon. Further items may then be added in the accounting device which will then indicate the total of the amounts added, altered by the variation on the first items only.

In cases where it is required to alter the percentage of variation in quick succession, the contact banks and wipers of the rotary switches can be multiplied and the corresponding contacts can be directly connected with the registering and indicating mechanisms, thus avoiding an alteration in the various connections. When operating the apparatus only the circuits over those contact banks and wipers are closed which correspond to the percentage of variation required in each case, while the other circuits remain interrupted.

Although in the embodiment described above rotary switches are used for the indicating of values and for the variation of these indications according to a predetermined percentage, the invention is not restricted to this specific embodiment. For example, relay trains can be used for determining the amounts to be added, which can be released depending on the originally indicated amount to alter this original indication.

Other modifications can be made within the scope of the invention, for example, alterations in conformity with the currency used in each case.

We claim:

1. An accounting device comprising electrically operated registering and indicating mechanisms including electrically operated rotary switches having contact banks and wipers, for the adding and subsequent indication of values in a plurality of different denominations, and variation means including additional contact banks and wipers associated with the rotary switches of all but the lowest of said denominations and operated by said switches, the contact banks associated with the switches for adding and indicating higher denominations being electrically connected with the input circuits of said registering and indicating mechanisms of lower denominations, and jumpering means interposed between said additional contact banks and said input circuits to establish electrical connections corresponding to a predetermined percentage of variation of the values initially indicated by said registering and indicating mechanisms, whereby said mechanisms register and indicate new values determined by said predetermined percentage of variation.

2. An accounting device comprising electrically operated registering and indicating mechanisms including electrically operated rotary switches having contact banks and wipers and for the adding and subsequent indication of values in a plurality of different denominations, variation means including additional contact banks and wipers associated with the rotary switches of all but the lowest of said denominations and operated by said rotary switches, the contact banks associated with the switches for adding and indicating high denominations being electrically connected with the input circuits of said registering and indicating mechanisms of lower denominations, a further additional contact bank associated with the rotary switch of the highest denomination and electrically connected with the indicating mechanism of said highest denomination, and switching means responsive to said variation means for operating said indicating mechanism under control of said further additional contact bank.

3. An accounting device comprising electrically operated registering and indicating mechanisms including electrically operated rotary switches having contact banks and wipers and for the adding and subsequent indication of values in a plurality of different denominations, and variation means including additional contact banks and wipers associated with the rotary switches of all but the lowest of said denominations and operated by said switches, electrical connections between said contact banks of high denominations and the input circuits of said registering and indicating mechanisms of lower denominations, said connections being predetermined in accordance with a predetermined percentage of variation of the initially indicated values, and a switching arrangement operable to complete electrical circuits over said electrical connections for the transmission of said value variations to said registering and indicating mechanisms, said switching arrangement including relay means for interrupting said circuits after said transmission during further adding operations of said registering and indicating mechanisms, and switching means operable after completion of said adding operations of said registering and indicating mechanisms to restore all said circuits to their initial condition.

4. An accounting device comprising electrically operated registering and indicating mechanisms including electrically operated rotary switches having contact banks and wipers and for the adding and subsequent indication of values in a plurality of different denominations, and variation means including additional contact banks and wipers associated with the rotary switches of all but the lowest denominations and operated by said switches, electrical connections between said contact banks of higher denominations and the input circuits of said registering and indicating mechanisms of lower denominations, said connections being predetermined in accordance with a predetermined percentage of variation of the initially indicated values, and a switching arrangement comprising a key-operated contact and relay means operated thereby to establish, and subsequently interrupt, electrical circuits over the additional contact banks of the rotary switches to transmit value variations for one denomination to the registering and indicating mechanisms of lower denominations, said relay means comprising a group of time delay relays so timed that an electrical circuit for the value variation of one denomination is interrupted before the electrical circuit for the value variation of the next lower denomination is established, and a further relay controlling said time delay relays for keeping said circuits interrupted during further adding operations of said registering and indicating mechanisms.

5. An accounting device comprising electrically operated adding and registering and indicating mechanisms for the adding and subsequent indication of values in various denominations; control means to operate said adding and registering and indicating mechanisms in accordance with predetermined values, and means for varying the registrations and indications by predetermined amounts, varying proportionally to each setting of said registering and indicating mechanisms; comprising variation means operable by said mechanisms, and including adjusting means to adjust the predetermined amount of variation, and electrical connections from said variation means, over said adjusting means, to said control means to reoperate said mechanisms, depending upon said settings, to register and indicate the varied values.

6. An accounting device comprising electrically operating adding and registering and indicating mechanisms for the adding and subsequent indication of values in various denominations; control means to operate said adding and registering and indicating mechanisms in accordance with predetermined values, and means for varying the registrations and indications by predetermined amounts, the complements of said amounts varying in proportion to each setting of said registering and indicating mechanisms; comprising variation means operable by said mechanisms, and including adjusting means to adjust the complements of the predetermined amount of variation, means to reduce by one the value unit to which the complement is taken, and electrical connections from said variation means, over said adjusting means, to said control means to re-operate said mechanisms, depending upon said settings, to register and indicate the varied values.

THOMAS S. SKILLMAN.
ALAN D. LACKEY.

REFERENCES CITED

The following references are of record in the file of this patent:

UNITED STATES PATENTS

| Number | Name | Date |
|---|---|---|
| 1,938,526 | Limb | Dec. 5, 1933 |
| 2,062,119 | Bryce | Nov. 24, 1936 |
| 2,172,078 | Ziguelde | Sept. 5, 1939 |
| 2,195,850 | Cunningham | Apr. 2, 1940 |
| 2,338,206 | Shafer | Jan. 4, 1944 |
| 2,434,500 | Leathers et al. | Jan. 13, 1948 |
| 2,477,722 | Coe et al. | Aug. 2, 1949 |